United States Patent Office 3,107,439
Patented Oct. 22, 1963

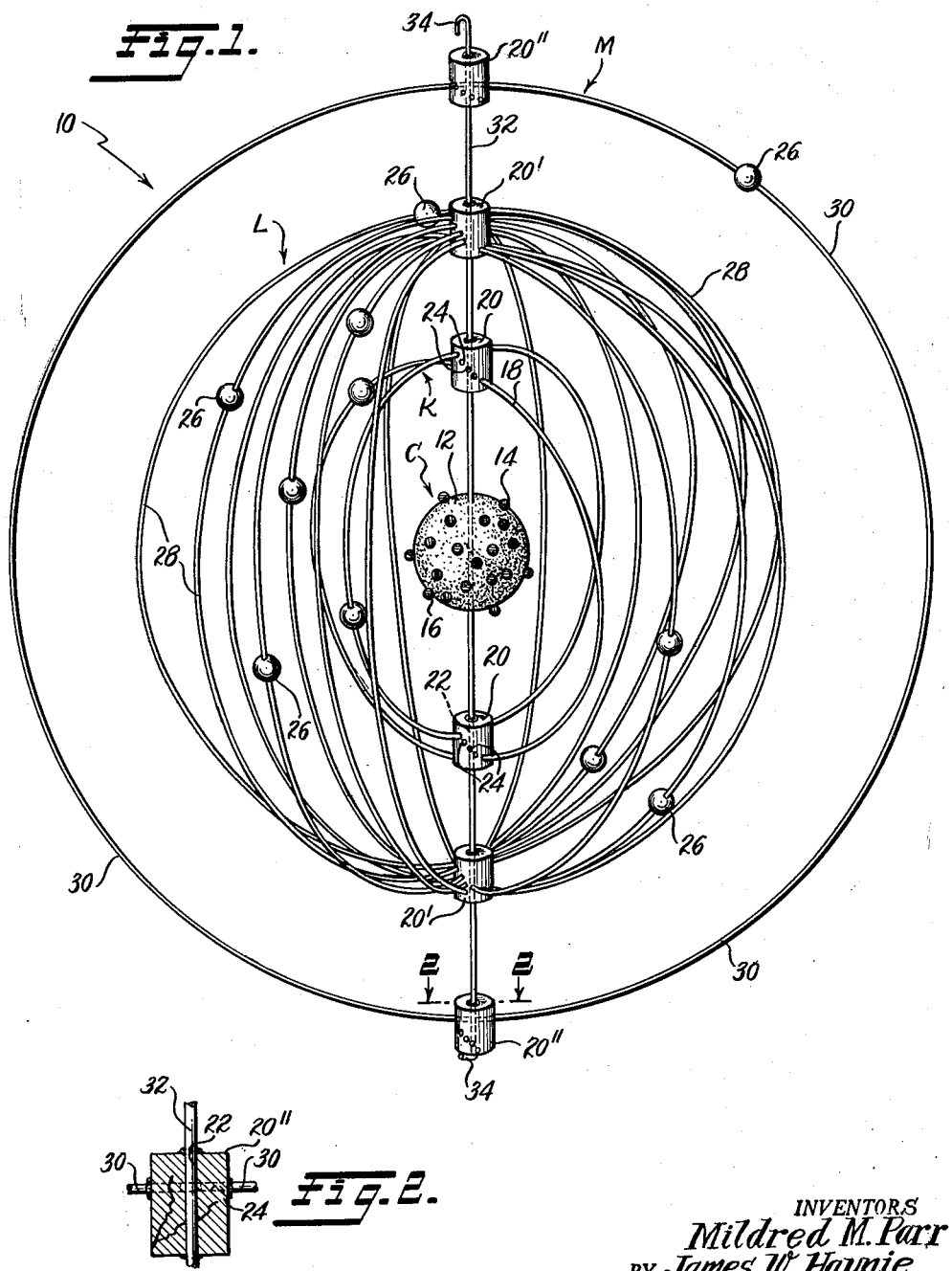

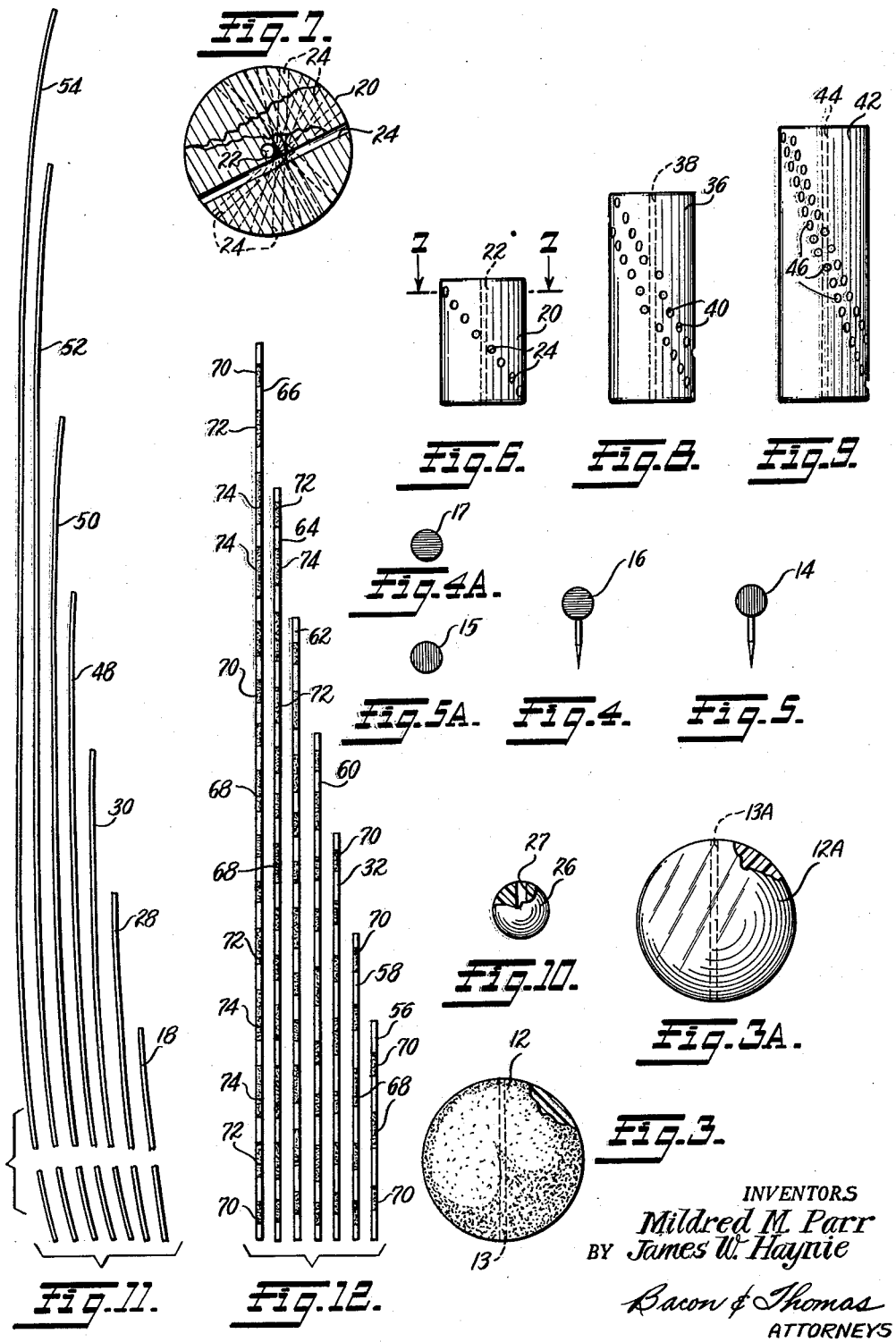

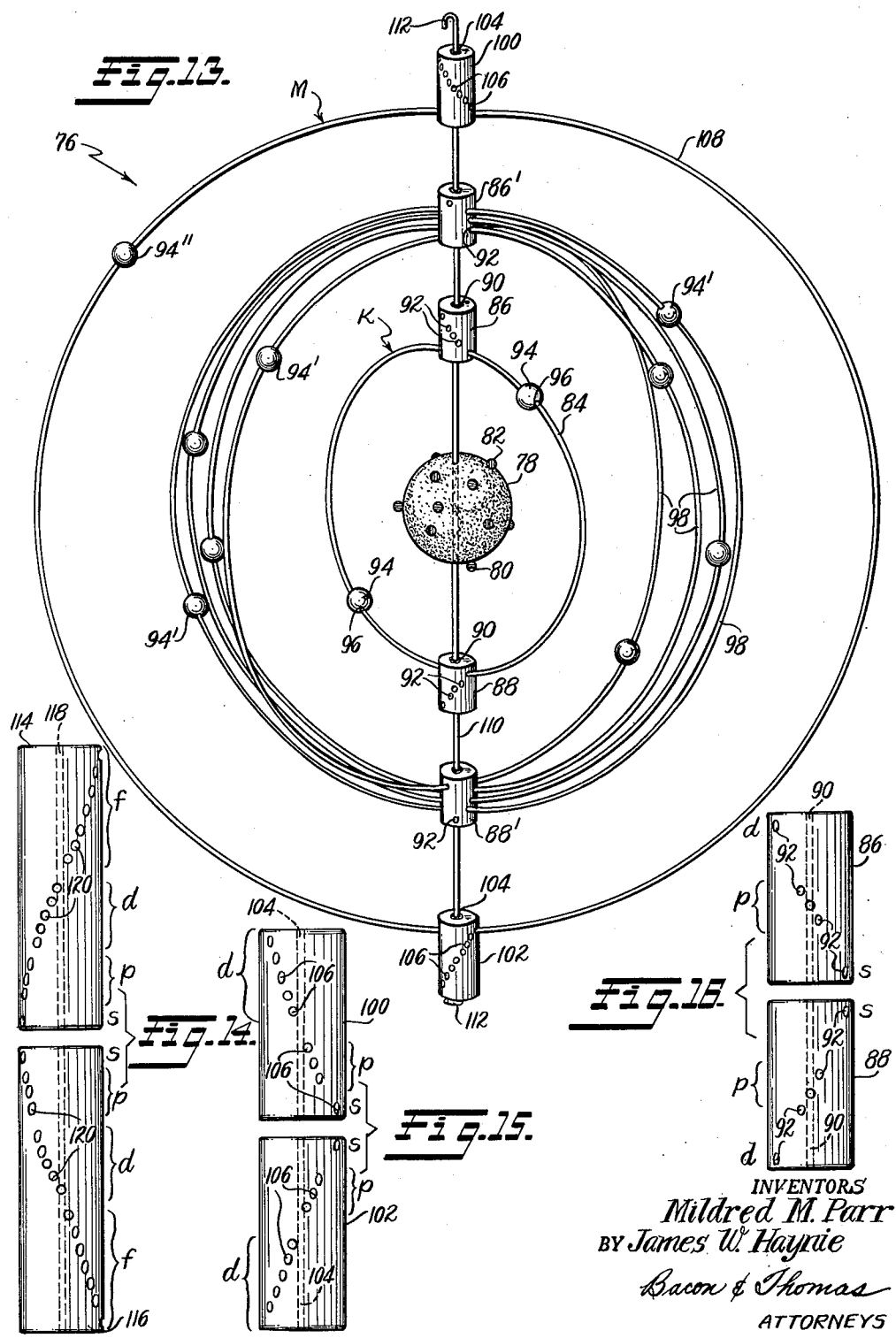

3,107,439
MODEL ATOM KIT
Mildred M. Parr, 728 Elizabeth, and James W. Haynie, 1222 Tyler, both of Corpus Christi, Tex.
Filed Dec. 19, 1960, Ser. No. 76,640
36 Claims. (Cl. 35—18)

This invention relates to an educational apparatus, and more specifically to a "do-it-yourself" kit comprising the necessary parts to enable a person to assemble a model atom of any of the more than one hundred discovered elements as well as many elements that may be later discovered.

It is a rather difficult matter to clearly illustrate a three dimensional atom by means of a two dimensional figure, such as a drawing, or to visualize the construction of an atom from such a two dimensional figure.

It is an object of the invention, therefore, to provide a novel kit having the necessary parts by which a novice can readily assemble a model of any discovered or undiscovered atom.

It is a further object to provide a kit of the nature described which includes a minimum number of different parts, thereby simplifying the assembly of a model of an atom.

It is a still further object to provide a novel model of an atom, formed of interconnecting core member, a diametric axis member, apertured cylinders fitted on the axis member, flexible wires bent in circles and passing through the apertures in said cylinders to simulate orbit shells, one or more beads on each wire to simulate electrons in orbit in a shell, and different colored pins in the core to simulate protons and neutrons forming the nucleus.

It is a still further object to provide a kit including axis members, apertured cylinders of different lengths and having different numbers of apertures to support wires in concentric shells, flexible wires of different lengths adapted to be arranged in circles passing through the apertures in the cylinders to simulate orbits in different shells, beads adapted to be strung on the wires to simulate electrons in orbit core members, and pins having different colored heads to be inserted in the core members to simulate neutrons and protons comprising the nucleus, there being sufficient parts in the kit to assemble a model of any of the discovered atoms, and many atoms not yet discovered.

The attainment of the above and other objects will become apparent from a consideration of the following specification and the accompanying drawings in which:

FIG. 1 is a perspective view of a model of a sodium atom, according to one accepted theory, assembled from parts of the kit comprising the invention;

FIG. 2 is a cross-sectional view through an apertured cylinder taken on the line 2—2 of FIG. 1;

FIGS. 3–7 show various component parts of a kit for assembling model atoms, in which FIG. 3 is a view, on an enlarged scale, partly in cross-section, of one form of core member;

FIG. 3A is a similar view of a different form of core member;

FIG. 4 shows, on an enlarged scale, a pin having a colored head to simulate a proton or a neutron;

FIG. 4A shows a similar view of a different form of member to simulate a neutron or proton;

FIG. 5 shows, on an enlarged scale, a pin having a differently colored head to simulate a proton or a neutron;

FIG. 5A shows a similar view of a different form of member to simulate a neutron or proton;

FIG. 6 shows, on an enlarged scale, a small size cylinder having eight transverse apertures;

FIG. 7 is a cross-sectional view taken on the line 7—7 of FIG. 6;

FIG. 8 shows a large size cylinder having twenty-four transverse apertures;

FIG. 9 shows a larger size cylinder having thirty-two transverse apertures;

FIG. 10 shows, on an enlarged scale, a bead to simulate an electron;

FIG. 11 shows seven different lengths of curved or arcuate wires used to simulate the orbits of the electrons;

FIG. 12 shows seven different lengths of straight wire used in the assembly of model atoms;

FIG. 13 shows a perspective view of a model of a sodium atom, according to a later theory known as Pauli's Exclusion Theory, assembled from a modified kit;

FIG. 14 shows a pair of upper and lower cylinders of a modified kit for assembling models of the form shown in FIG. 13;

FIG. 15 shows another pair of upper and lower cylinders for assembling models of the form shown in FIG. 13; and FIG. 16 shows still another pair of upper and lower cylinders for assembling models of the form shown in FIG. 13.

According to present accepted theory of atomic structure, an atom comprises one or more negative electrical charges, called electrons, which whirl or orbit about a center or nucleus made up of neutrons and protons. Each atom has an atomic number which corresponds to its number of electrons. For example, the simplest atom, hydrogen, has an atomic number of 1 and includes a single electron, while a more complex atom, such as uranium, has an atomic number of 92 and includes 92 electrons. One accepted theory holds that each electron travels in a separate orbit, and that the orbits of the electrons may lie in one or more concentric shells. There may be as few as a single shell, or as many as seven, the shells being designated as K, L, M, N, O, P and Q beginning within the innermost.

A recently published theory, referred to as the Pauli's Exclusion Theory, places the electrons in each shell into one or more subshells, designated as s, p, d and f subshells, and places two electrons in the same orbit, except in the case of an odd number of electrons, wherein there is a single electron in an orbit.

The proton is a positive or plus charge of electricity, and a neutron has no charge. There are as many protons in an atom as there are electrons. Except in the case of hydrogen, which has no neutrons, the number of neutrons can be determined by subtracting the atomic number of the atom from its atomic weight. Thus, for uranium, having an atomic weight of 238 and an atomic number of 92, the number of protons is 92, and the number of neutrons is 238 minus 92, or 146.

Present accepted theory also recognizes that the number of electrons in the K-shell can be as few as one in the case of hydrogen, and not more than two in the case of any other element. In the L-shell, the number may range from one to a maximum of eight. The number may range from one to eighteen in the M-shell; from one to thirty-two in the N-shell; from one to thirty-one in the O-shell; from one to ten in the P-shell, and from one to two in the Q-shell. This range applies to the atoms of known elements, and it is possible that the atoms of elements that have not been discovered may have more than seven shells, or may have more than the numbers above indicated in any shell.

From the above, it is evident that it is possible to provide a kit comprising a relatively few number of different parts which can be assembled into atom models of any of the discovered elements and many likely to be discovered.

FIG. 1 illustrates a model of a sodium atom, constructed according to one generally accepted theory, having eleven (11) electrons, eleven (11) protons, and twelve (12) neutrons. As shown, there are two electrons in the K-shell, eight electrons in the L-shell, and one electron in the M-shell.

The model, designated in its entirety by the numeral 10, comprises a spherical core or nucleus C, an inner shell K, an intermediate shell L, and an outer shell M. The several shells are generally concentric and are relatively spaced, and each includes one or more orbit and electron simulating means disposed in different planes.

The nucleus C comprises a spherical core member 12 to which is attached a number of objects 14 of one color and a number of objects 16 of a different color. The core member 12 may be made of an opaque plastic material, such as Styrofoam spheres, in which case the objects 14 and 16 can be formed of pins having differently colored heads, or the core member could be made of a transparent plastic, such as Lucite, in which case the objects 14 and 16 can be made of differently colored beads or balls held on the surface of the core member by some suitable pressure-sensitive adhesive. Red and blue objects may be used, or any other combination of colors, one color being used to simulate the neutrons and the other color being used to simulate the protons, comprising the nucleus.

The shells are similar in construction. The innermost shell K comprises a pair of apertured cylinders 20, having axial bores 22 and a series of transverse bores 24. As shown in FIG. 2, the transverse bores 24 are parallel with a diameter, lying to one side thereof, and the openings are angularly staggered in the form of a helix. A pair of resilient wires 18, disposed at right angles to each other, are used to simulate the orbits of electrons 26. A wire 18 is passed entirely through one of the transverse apertures 24 in one of the cylinders 20, and the ends of the wire are received within opposite ends of an aperture 24 in the other cylinder. The wires and cylinders can be retained in assembled relation by applying a drop of cement or glue at the aperture opening. To enable the use of wires in the inner shell of the same length, it will be noted that the upper end of the loop formed by one of the wires is received within the outermost aperture 24, while the lower end of the loop is received within the innermost aperture 24, and similarly, the upper end of the other loop is received within the innermost aperture, while the lower part of the loop is received within the outermost aperture. If more than two wires in any shell are employed, the same general pattern of assembly is followed, as shown, for example, in the arrangement of the shell L. Each wire 18 in the shell K simulates an orbit of an electron 26, comprising a bead surrounding the wire and held in place by a drop of glue or other adhesive.

The L-shell has a greater diameter than the K-shell and is disposed concentric with and in spaced relation thereto. The L-shell is similarly formed by using a pair of opposed cylinders 20' of the same form and having the same number of apertures as the cylinder 20. Longer wires 28 are used, which pass through the apertures 24 in the same manner, and each wire has a bead 26 thereon to simulate an electron. It will be observed that wires pass through all eight of the apertures 24 in the cylinders 20' of the L-shell.

The M-shell is similarly formed, comprising a pair of opposed shells 20" of the same shape and having the same number of apertures as the cylinder 20. The M-shell includes a single wire 30, longer than the wires 28 of the intermediate shell L, the wire 30 having thereon a bead 26.

The cylinders 20, 20' and 20" are identical, but have been designated differently to facilitate the description of the atom.

Each of the cylinders 20, 20' and 20" is provided with a longitudinal aperture or bore 22, adapted to receive a straight axial wire 32 to retain the core and the several cylinders supporting the shells in proper assembled relation. The wire 32 passes through a diametric aperture in the core member 12, and the various parts, namely, core 12 and cylinders 20, 20', and 20" are retained in proper assembled position by a drop of glue or other adhesive at the points where the wire 32 enters the bores 22 and the opening in the core member 12. The ends of the axial wire 32 may be bent, as shown at 34, to prevent the cylinders from slipping off should they work loose and to facilitate handling of the model.

While, in the preceding description, the maximum number of wires in any one shell, simulating the orbits of electrons, does not exceed eight, it is evident that the model of any atom can be constructed by providing cylinders having a sufficient number of apertures to accommodate the maximum number of orbits in any one shell. Reference is made to the following Chart I, which lists 102 of the known atoms, giving their names, symbols, atomic weight to the nearest whole number, the atomic number, the designation of the shells and the number of electrons in each shell. As an example, reference is made to the sodium atom having an atomic number of 11, and including following notation: "K–2, L–8, M–1," which indicates that a sodium atom comprises shells K, L and M, that shell K includes two electrons, shell L includes eight electrons, and shell M includes one electron, corresponding to the model in FIG. 1.

With reference to uranium, it will be noted that an atom of this element includes shells K, L, M, N, O, P and Q, that there are two electrons in the K-shell, eight electrons in the L-shell, 18 electrons in the M-shell, 32 electrons in the N-shell, 21 electrons in the O-shell, nine electrons in the P-shell, and two electrons in the Q-shell.

CHART I

| Name of atom | Symbol | Atomic weight nearest whole number | Atomic number | Shells and number of electrons in shells |
|---|---|---|---|---|
| Hydrogen | H | 1 | 1 | K-1. |
| Helium | He | 4 | 2 | K-2. |
| Lithium | Li | 7 | 3 | K-2, L-1. |
| Beryllium | Be | 9 | 4 | K-2, L-2. |
| Boron | B | 11 | 5 | K-2, L-3. |
| Carbon | C | 12 | 6 | K-2, L-4. |
| Nitrogen | N | 14 | 7 | K-2, L-5. |
| Oxygen | O | 16 | 8 | K-2, L-6. |
| Fluorine | F | 19 | 9 | K-2, L-7. |
| Neon | Ne | 20 | 10 | K-2, L-8. |
| Sodium | Na | 23 | 11 | K-2, L-8, M-1. |
| Magnesium | Mg | 24 | 12 | K-2, L-8, M-2. |
| Aluminum | Al | 27 | 13 | K-2, L-8, M-3. |
| Silicon | Si | 28 | 14 | K-2, L-8, M-4. |
| Phosphorus | P | 31 | 15 | K-2, L-8, M-5. |
| Sulfur | S | 32 | 16 | K-2, L-8, M-6. |
| Chlorine | Cl | 35 | 17 | K-2, L-8, M-7. |
| Argon | Ar | 40 | 18 | K-2, L-8, M-8. |
| Potassium | K | 39 | 19 | K-2, L-8, M-8, N-1. |
| Calcium | Ca | 40 | 20 | K-2, L-8, M-8, N-2. |
| Scandium | Sc | 45 | 21 | K-2, L-8, M-9, N-2. |
| Titanium | Ti | 48 | 22 | K-2, L-8, M-10, N-2. |
| Vanadium | V | 51 | 23 | K-2, L-8, M-11, N-2. |
| Chromium | Cr | 52 | 24 | K-2, L-8, M-13, N-1. |
| Manganese | Mn | 55 | 25 | K-2, L-8, M-13, N-2. |
| Iron | Fe | 56 | 26 | K-2, L-8, M-14, N-2. |
| Cobalt | Co | 59 | 27 | K-2, L-8, M-15, N-2. |
| Nickel | Ni | 59 | 28 | K-2, L-8, M-16, N-2. |
| Copper | Cu | 64 | 29 | K-2, L-8, M-18, N-1. |
| Zinc | Zn | 65 | 30 | K-2, L-8, M-18, N-2. |
| Gallium | Ga | 70 | 31 | K-2, L-8, M-18, N-3. |
| Germanium | Ge | 73 | 32 | K-2, L-8, M-18, N-4. |
| Arsenic | As | 75 | 33 | K-2, L-8, M-18, N-5. |
| Selenium | Se | 79 | 34 | K-2, L-8, M-18, N-6. |
| Bromine | Br | 80 | 35 | K-2, L-8, M-18, N-7. |
| Krypton | Kr | 84 | 36 | K-2, L-8, M-18, N-8. |
| Rubidium | Rb | 85 | 37 | K-2, L-8, M-18, N-8, O-1. |
| Strontium | Sr | 88 | 38 | K-2, L-8, M-18, N-8, O-2. |
| Yttrium | Y | 89 | 39 | K-2, L-8, M-18, N-9, O-2. |
| Zirconium | Zr | 91 | 40 | K-2, L-8, M-18, N-10, O-2. |
| Niobium | Nb | 93 | 41 | K-2, L-8, M-18, N-12, O-1. |
| Molybdenum | Mo | 96 | 42 | K-2, L-8, M-18, N-13, O-1. |
| Technetium | Tc | 99 | 43 | K-2, L-8, M-18, N-14, O-1. |
| Ruthenium | Ru | 101 | 44 | K-2, L-8, M-18, N-15, O-1. |
| Rhodium | Rh | 103 | 45 | K-2, L-8, M-18, N-16, O-1. |
| Palladium | Pd | 106 | 46 | K-2, L-8, M-18, N-18. |
| Silver | Ag | 108 | 47 | K-2, L-8, M-18, N-18, O-1. |
| Cadmium | Cd | 112 | 48 | K-2, L-8, M-18, N-18, O-2. |
| Indium | In | 115 | 49 | K-2, L-8, M-18, N-18, O-3. |
| Tin | Sn | 119 | 50 | K-2, L-8, M-18, N-18, O-4. |
| Antimony | Sb | 122 | 51 | K-2, L-8, M-18, N-18, O-5. |
| Tellurium | Te | 128 | 52 | K-2, L-8, M-18, N-18, O-6. |
| Iodine | I | 127 | 53 | K-2, L-8, M-18, N-18, O-7. |

CHART I—Continued

| Name of atom | Symbol | Atomic weight nearest whole number | Atomic number | Shells and number of electrons in shells |
|---|---|---|---|---|
| Xenon | Xe | 131 | 54 | K-2, L-8, M-18, N-18, O-8. |
| Cesium | Cs | 133 | 55 | K-2, L-8, M-18, N-18, O-8, P-1. |
| Barium | Ba | 137 | 56 | K-2, L-8, M-18, N-18, O-8, P-2. |
| Lanthanum | La | 139 | 57 | K-2, L-8, M-18, N-18, O-9, P-2. |
| Cerium | Ce | 140 | 58 | K-2, L-8, M-18, N-20, O-8, P-2. |
| Praseodymium | Pr | 141 | 59 | K-2, L-8, M-18, N-21, O-8, P-2. |
| Neodymium | Nd | 144 | 60 | K-2, L-8, M-18, N-22, O-8, P-2. |
| Promethium | Pm | 147 | 61 | K-2, L-8, M-18, N-23, O-8, P-2. |
| Samarium | Sm | 150 | 62 | K-2, L-8, M-18, N-24, O-8, P-2. |
| Europium | Eu | 152 | 63 | K-2, L-8, M-18, N-25, O-8, P-2. |
| Gadolinium | Gd | 157 | 64 | K-2, L-8, M-18, N-25, O-9, P-2. |
| Terbium | Tb | 159 | 65 | K-2, L-8, M-18, N-27, O-8, P-2. |
| Dysprosium | Dy | 163 | 66 | K-2, L-8, M-18, N-28, O-8, P-2. |
| Holmium | Ho | 165 | 67 | K-2, L-8, M-18, N-29, O-8, P-2. |
| Erbium | Er | 167 | 68 | K-2, L-8, M-18, N-30, O-8, P-2. |
| Thulium | Tm | 169 | 69 | K-2, L-8, M-18, N-31, O-8, P-2. |
| Ytterbium | Yb | 173 | 70 | K-2, L-8, M-18, N-32, O-8, P-2. |
| Lutetium | Lu | 175 | 71 | K-2, L-8, M-18, N-32, O-9, P-2. |
| Hafnium | Hf | 179 | 72 | K-2, L-8, M-18, N-32, O-10, P-2. |
| Tantalum | Ta | 181 | 73 | K-2, L-8, M-18, N-32, O-11, P-2. |
| Wolfram | W | 184 | 74 | K-2, L-8, M-18, N-32, O-12, P-2. |
| Rhenium | Re | 186 | 75 | K-2, L-8, M-18, N-32, O-13, P-2. |
| Osmium | Os | 190 | 76 | K-2, L-8, M-18, N-32, O-14, P-2. |
| Iridium | Ir | 193 | 77 | K-2, L-8, M-18, N-32, O-15, P-2. |
| Platinum | Pt | 195 | 78 | K-2, L-8, M-18, N-32, O-17, P-1. |
| Gold | Au | 197 | 79 | K-2, L-8, M-18, N-32, O-18, P-1. |
| Mercury | Hg | 201 | 80 | K-2, L-8, M-18, N-32, O-18, P-2. |
| Thallium | Tl | 204 | 81 | K-2, L-8, M-18, N-32, O-18, P-3. |
| Lead | Pb | 207 | 82 | K-2, L-8, M-18, N-32, O-18, P-4. |
| Bismuth | Bi | 209 | 83 | K-2, L-8, M-18, N-32, O-18, P-5. |
| Polonium | Po | 210 | 84 | K-2, L-8, M-18, N-32, O-18, P-6. |
| Astatine | At | 210 | 85 | K-2, L-8, M-18, N-32, O-18, P-7. |
| Radon | Rn | 222 | 86 | K-2, L-8, M-18, N-32, O-18, P-8. |
| Francium | Fr | 223 | 87 | K-2, L-8, M-18, N-32, O-18, P-8, Q-1. |
| Radium | Ra | 226 | 88 | K-2, L-8, M-18, N-32, O-18, P-8, Q-2. |
| Actinium | Ac | 227 | 89 | K-2, L-8, M-18, N-32, O-18, P-9, Q-2. |
| Thorium | Th | 232 | 90 | K-2, L-8, M-18, N-32, O-18, P-10, Q-2. |
| Protactinium | Pa | 231 | 91 | K-2, L-8, M-18, N-32, O-20, P-9, Q-2. |
| Uranium | U | 238 | 92 | K-2, L-8, M-18, N-32, O-21, P-9, Q-2. |
| Neptunium | Np | 237 | 93 | K-2, L-8, M-18, N-32, O-22, P-9, Q-2. |
| Plutonium | Pu | 242 | 94 | K-2, L-8, M-18, N-32, O-23, P-9, Q-2. |
| Americium | Am | 243 | 95 | K-2, L-8, M-18, N-32, O-25, P-8, Q-2. |
| Curium | Cm | 247 | 96 | K-2, L-8, M-18, N-32, O-25, P-9, Q-2. |
| Berkelium | Bk | 249 | 97 | K-2, L-8, M-18, N-32, O-26, P-9, Q-2. |
| Californium | Cf | 251 | 98 | K-2, L-8, M-18, N-32, O-27, P-9, Q-2. |
| Einsteinium | Es | 254 | 99 | K-2, L-8, M-18, N-32, O-28, P-9, Q-2. |
| Fermium | Fm | 253 | 100 | K-2, L-8, M-18, N-32, O-29, P-9, Q-2. |
| Mendelevium | Md | 256 | 101 | K-2, L-8, M-18, N-32, O-30, P-9, Q-2. |
| Nobelium | No | 254 | 102 | K-2, L-8, M-18, N-32, O-31, P-9, Q-2. |

An analysis of the shells and the number of electrons in each shell, as included in Chart I above, shows that there are never more than two electrons in the K-shell; there are never more than eight electrons in the L-shell; there are never more than eighteen electrons in the M-shell; there are never more than thirty-two electrons in the N-shell; there are never more than thirty-one electrons in the O-shell; there are never more than nine electrons in the P-shell, except in thorium which has 10 electrons in the P-shell; and there are never more than two electrons in the Q-shell. It will be noted that the number of electrons in the K-shell has remained at two after having reached this number, that the number of electrons in the L-shell has remained at eight after having reached that number, that the number of electrons in the M-shell has remained at eighteen, that the number of electrons in the N-shell has remained at thirty-two, that the number of electrons in the O-shell is gradually increasing, that the number of electrons in the P-shell has reached nine and shows evidence of possible increase, and that the number of electrons in the Q-shell has remained at two. From the foregoing, it may be presumed that the number of electrons in the O-shell may eventually increase to thirty-two, and that the number of electrons in the P-shell may increase slightly. The total number of expected increase is immaterial, but the important thing to note, from this chart, is that it is possible to provide three different forms of cylinders to cover all possible atom models, thereby reducing the total number of different forms of cylinders needed in a kit. For instance, a cylinder having eight apertures can be used in the K, L and Q-shells, and in most of the P-shells. Cylinders having twenty-four transverse apertures can be used in the M-shells and in most of the O-shells, and a third form of cylinder, having thirty-two transverse apertures, can be used in all N-shells.

FIGS. 3 through 12 show the components of a kit according to a first embodiment of the invention. FIGS. 3, 4 and 5 show the parts to construct a nucleus, comprising a sphere 12 of an opaque plastic, such as Styrofoam, which can be provided with a diametric aperture 13 or such an aperture can easily be made, when required, by puncturing with any of the wires. FIG. 4 shows a pin 16 having a blue head, FIG. 5 shows a pin 14 having a red head, one of which can arbitrarily be used to simulate a neutron and the other to simulate a proton. The kit also includes an ample number of such spheres and pins, which can be used to form the nuclei of many atoms. FIG. 3A shows a modified transparent sphere 12A, which can be made of Lucite having a diametric aperture 13A, and FIGS. 4A and 5A show differently colored beads or balls 17 and 15 which can be used to simulate a neutron and proton, and can be attached to the surface of the sphere 12A by any well-known pressure-sensitive adhesive.

FIGS. 6, 7, 8 and 9 illustrate the details of three different size cylinders that can be employed. Referring to FIGS. 6 and 7, the cylinder 20 has a central axial bore 22 and eight transverse evenly spaced bores 24. Referring to FIGS. 6 and 7, it will be noted that the transverse bores 24 are not diametrically disposed, but are arranged parallel with a diameter, and are angularly staggered so that the opposite ends thereof lie along parallel helices. FIG. 8 shows a longer cylinder 36 having an axial bore 38, and twenty-four transverse apertures 40, the ends of which are arranged in pairs of parallel helices. FIG. 9 shows the longest cylinder 42, having an axial bore 44 and thirty-two transverse apertures 46 arranged in two parallel rows of sixteen each, the ends of which are arranged in parallel helices.

FIG. 11 illustrates seven different lengths of arcuate or curved wires 18, 28, 30, 48, 50, 52 and 54, which may be used to simulate the orbits of the electrons in the shells K, L, M, N, O, P and Q, respectively.

FIG. 12 shows seven different lengths of axial wires, 56, 58, 32, 60, 62, 64 and 66, to be used to assemble models of atoms having one shell, two shells, three shells, four shells, five shells, six shells and seven shells, respectively. The axial wires shown in FIG. 12 are straight, and are usually of heavier gage than the wires used to simulate the orbits.

The axial wires are provided with appropriate markings to facilitate the assembly. Referring to the axial wire 56, it will be noted that it includes a central band 68, and two end bands, equally spaced, designated 70. The central band 68 has a length corresponding to the diameter of the core member 12 (or 12A), while the bands 70 have a length corresponding to the length of a cylinder 20. In like manner, all of the axial wires include a central band 68.

Referring to the axial wire 58, it will be observed that it includes a central band 68, end bands 70, and intermediate bands 70, all the bands 70 having a length corresponding to the length of a cylinder 20.

Referring to the axial wire 66, it will be observed that, beginning with the central band 68, and listing the bands toward either end, there are two spaced bands 70, each having a length corresponding to the length of a cylinder 20; a band 72, corresponding to the length of a cylinder 36, two bands 74, each having a length corresponding to the length of a cylinder 42; a band 72 having a length corresponding to a cylinder 36, and a band 70 having a length corresponding to the length of a cylinder 20.

While FIGS. 3 to 12 illustrate only one of each of the components making up the kit, it will be understood that a kit comprises a number of each of these components, sufficient to construct a number of different models of any atom of any element that has been discovered or that may be discovered in the near future.

The dimensions of the various parts are not critical, and can be selected to provide a convenient sized model. By way of example, the cylinders 20, 36 and 42 may have a diameter of ½"; the cylinder 20 may be ¾" long, the cylinder 36 may be 1⅛" long, and the cylinder 42 may be 1½" long. The apertures in the cylinders may be formed by using a size 60 drill. The wire 18 for the K-shell can be 14½" long; the wire 28 for the L-shell may be 24" long; the wire 30 for the M-shell may be 35" long; the wire 48 for the N-shell may be 45" long; the wire 50 for the O-shell may be 57" long; the wire 52 for the P-shell may be 70½" long; and the wire 54 for the Q-shell may be 85" long.

The axial wire 56 may be 7½" long; the axial wire 58 may be 10⅝" long; the axial wire 32 may be 14"; the axial wire 60 may be 17½"; the axial wire 62 may be 21¼"; the axial wire 64 may be 27"; and the axial wire 66 may be 31".

While, in the above description of the kit, emphasis has been placed on the construction of atom models according to an accepted theory having K, L, M, N, O, P and Q shells and distinct orbits for each electron, it is evident that the kit disclosed could be modified and employed to construct models according to Pauli's Exclusion Theory involving $s$, $p$, $d$ and $f$ subshells, by placing two beads on certain wires simulating orbits.

According to Pauli's Exclusion Theory, the shells L, M, N, O, P and Q are further subdivided into two or more groups or subshells designated, for convenience, by the letters $s$, $p$, $d$ and $f$. Each subshell comprises one or more orbits having one or two electrons in each orbit. The orbits comprising each subshell are grouped closely adjacent one another, and the grouped orbits comprising one subshell are spaced from the grouped orbits comprising an adjoining subshell, as will appear more clearly hereinafter.

FIG. 13 shows a model sodium atom 76 constructed according to Pauli's Exclusion Theory, showing six orbits in shells K, L and M, and a total of eleven electrons, two in each orbit except in the outermost shell M in which there is a single electron in orbit.

The model 76 may be assembled from a core member 78, which may be identical with the core member 12 of FIGS. 1 and 3 (or 3A), having a number of pins 80 of one color to simulate neutrons and a number of pins 82 of a different color to simulate protons.

The K-shell comprises an upper cylinder 86 and a lower cylinder 88, each having an axial bore 90 and a series of transverse bores 92. An arcuate flexible wire 84 passes through the lowermost bore 92 of the upper cylinder 86 and through the uppermost bore 92 of the lower cylinder 88. The wire 84 is identical with the wire 18 of FIGS. 1 and 11, and may be looped through the bore 92 in the upper cylinder 86 with the ends of the wire entering opposite ends of bore 92 in the lower cylinder 88. The wire 84 simulates an orbit in the K-shell, and carries a pair of beads 94, simulating electrons, spaced 180° apart. Each bead has a diametric bore 96 through which the wire 84 passes.

The L-shell comprises an upper cylinder 86' and a lower cylinder 88', which cylinders are identical in construction with the cylinders 86 and 88, respectively, but are designated by different characters to facilitate the description. Four arcuate flexible wires 98 are looped through the four lowermost bores 92 of the upper cylinder 86' and through the four uppermost bores 92 of the lower cylinder 88' in the same manner as the wire 84. The wires are arranged so that they pass through corresponding transverse bores in the upper and lower cylinders. Thus, one wire 98 passes through the lowermost bore 92 of the upper cylinder 86' and through the uppermost bore 92 in the lower cylinder 88'; another wire 98 passes through the next to the lowermost bore 92 of the upper cylinder 86' and through the next to the uppermost bore 92 in the lower cylinder 88'; and so on. Each wire 98 simulates an orbit in the L-shell, and carries a pair of beads 94' spaced 180° apart. The beads 94' are identical to the beads 94 and 26.

The M-shell comprises an upper cylinder 100 and a lower cylinder 102. Each cylinder includes an axial bore 104 and a series of transverse bores 106, the ends of which are angularly staggered to lie along a pair of helices. A single wire 108 passes through the lowermost bore 106 in the upper cylinder 100 and through the uppermost bore 106 in the lower cylinder 102, in the same manner as described above in connection with the wire 84 of the K-shell. The wire 108 carries a single bead 94", which is identical with beads 94 and 26. The bead 94" simulates an electron whirling about in an orbit simulated by the wire 108.

The various cylinders 86, 88, 86', 88', 100 and 102, and the bore member 78, are held in assembled relation by a straight wire 110 which passes through the axial bores 104 of the cylinders 100 and 102, through the axial bores 90 of the cylinders 86, 88, 86' and 88', and diametrically through the core member 78, as shown. The parts may be held in this assembled relation by a drop of cement or glue within the axial bores, and at the points where the wire passes through the core member 78. The ends of the wire 110 may be bent at 112 to prevent the cylinders from slipping off the ends, should they become loose, and also to facilitate handling.

Chart II, appearing below, lists, for each of 102 known elements, the following information:
(1) Atomic number
(2) The symbol for the element
(3) The number of orbits in the K, L, M, N, O, P and Q-shells. Under the headings K, L, M, N, O, P and Q appear subheadings designated by the letters $s$, $p$, $d$, and $f$, to indicate the subshells.

CHART II

Number of Wires in Each Shell and Subshell

[Each wire has two electrons placed in direct opposition to each other, on each side of the nucleus, unless (1) appears after the number. In that case place only one electron on the wire farthest from the nucleus]

| Atomic number | Element symbol | Shells: K (1) | L (2) | | M (3) | | | N (4) | | | | O (5) | | | | P (6) | | | | Q (7) | | | |
|---|---|---|---|---|---|---|---|---|---|---|---|---|---|---|---|---|---|---|---|---|---|---|---|
| | | s | s | p | s | p | d | s | p | d | f | s | p | d | f | s | p | d | f | s | p | d | f |
| 1 | H | 1(1) | | | | | | | | | | | | | | | | | | | | | |
| 2 | He | 1 | | | | | | | | | | | | | | | | | | | | | |
| 3 | Li | 1 | 1(1) | | | | | | | | | | | | | | | | | | | | |
| 4 | Be | 1 | 1 | | | | | | | | | | | | | | | | | | | | |
| 5 | B | 1 | 1 | 1(1) | | | | | | | | | | | | | | | | | | | |
| 6 | C | 1 | 1 | 1 | | | | | | | | | | | | | | | | | | | |
| 7 | N | 1 | 1 | 2(1) | | | | | | | | | | | | | | | | | | | |
| 8 | O | 1 | 1 | 2 | | | | | | | | | | | | | | | | | | | |
| 9 | F | 1 | 1 | 3(1) | | | | | | | | | | | | | | | | | | | |
| 10 | Ne | 1 | 1 | 3 | | | | | | | | | | | | | | | | | | | |
| 11 | Na | 1 | 1 | 3 | 1(1) | | | | | | | | | | | | | | | | | | |
| 12 | Mg | 1 | 1 | 3 | 1 | | | | | | | | | | | | | | | | | | |
| 13 | Al | 1 | 1 | 3 | 1 | 1(1) | | | | | | | | | | | | | | | | | |
| 14 | Si | 1 | 1 | 3 | 1 | 1 | | | | | | | | | | | | | | | | | |
| 15 | P | 1 | 1 | 3 | 1 | 2(1) | | | | | | | | | | | | | | | | | |
| 16 | S | 1 | 1 | 3 | 1 | 2 | | | | | | | | | | | | | | | | | |
| 17 | Cl | 1 | 1 | 3 | 1 | 3(1) | | | | | | | | | | | | | | | | | |
| 18 | Ar | 1 | 1 | 3 | 1 | 3 | | | | | | | | | | | | | | | | | |
| 19 | K | 1 | 1 | 3 | 1 | 3 | | 1(1) | | | | | | | | | | | | | | | |
| 20 | Ca | 1 | 1 | 3 | 1 | 3 | | 1 | | | | | | | | | | | | | | | |
| 21 | Sc | 1 | 1 | 3 | 1 | 3 | 1(1) | 1 | | | | | | | | | | | | | | | |
| 22 | Ti | 1 | 1 | 3 | 1 | 3 | 1 | 1 | | | | | | | | | | | | | | | |
| 23 | V | 1 | 1 | 3 | 1 | 3 | 2(1) | 1 | | | | | | | | | | | | | | | |
| 24 | Cr | 1 | 1 | 3 | 1 | 3 | 3(1) | 1(1) | | | | | | | | | | | | | | | |
| 25 | Mn | 1 | 1 | 3 | 1 | 3 | 3(1) | 1 | | | | | | | | | | | | | | | |
| 26 | Fe | 1 | 1 | 3 | 1 | 3 | 3 | 1 | | | | | | | | | | | | | | | |
| 27 | Co | 1 | 1 | 3 | 1 | 3 | 4(1) | 1 | | | | | | | | | | | | | | | |
| 28 | Ni | 1 | 1 | 3 | 1 | 3 | 4 | 1 | | | | | | | | | | | | | | | |
| 29 | Cu | 1 | 1 | 3 | 1 | 3 | 5 | 1(1) | | | | | | | | | | | | | | | |
| 30 | Zn | 1 | 1 | 3 | 1 | 3 | 5 | 1 | | | | | | | | | | | | | | | |
| 31 | Ga | 1 | 1 | 3 | 1 | 3 | 5 | 1 | 1(1) | | | | | | | | | | | | | | |
| 32 | Ge | 1 | 1 | 3 | 1 | 3 | 5 | 1 | 1 | | | | | | | | | | | | | | |
| 33 | As | 1 | 1 | 3 | 1 | 3 | 5 | 1 | 2(1) | | | | | | | | | | | | | | |
| 34 | Se | 1 | 1 | 3 | 1 | 3 | 5 | 1 | 2 | | | | | | | | | | | | | | |
| 35 | Br | 1 | 1 | 3 | 1 | 3 | 5 | 1 | 3(1) | | | | | | | | | | | | | | |
| 36 | Kr | 1 | 1 | 3 | 1 | 3 | 5 | 1 | 3 | | | | | | | | | | | | | | |
| 37 | Rb | 1 | 1 | 3 | 1 | 3 | 5 | 1 | 3 | | | 1(1) | | | | | | | | | | | |
| 38 | Sr | 1 | 1 | 3 | 1 | 3 | 5 | 1 | 3 | | | 1 | | | | | | | | | | | |
| 39 | Y | 1 | 1 | 3 | 1 | 3 | 5 | 1 | 3 | 1(1) | | 1 | | | | | | | | | | | |
| 40 | Zr | 1 | 1 | 3 | 1 | 3 | 5 | 1 | 3 | 1 | | 1 | | | | | | | | | | | |
| 41 | Nb | 1 | 1 | 3 | 1 | 3 | 5 | 1 | 3 | 2 | | 1(1) | | | | | | | | | | | |
| 42 | Mo | 1 | 1 | 3 | 1 | 3 | 5 | 1 | 3 | 3(1) | | 1(1) | | | | | | | | | | | |
| 43 | Tc | 1 | 1 | 3 | 1 | 3 | 5 | 1 | 3 | 3 | | 1(1) | | | | | | | | | | | |
| 44 | Ru | 1 | 1 | 3 | 1 | 3 | 5 | 1 | 3 | 4(1) | | 1(1) | | | | | | | | | | | |
| 45 | Rh | 1 | 1 | 3 | 1 | 3 | 5 | 1 | 3 | 4 | | 1(1) | | | | | | | | | | | |
| 46 | Pd | 1 | 1 | 3 | 1 | 3 | 5 | 1 | 3 | 5 | | | | | | | | | | | | | |
| 47 | Ag | 1 | 1 | 3 | 1 | 3 | 5 | 1 | 3 | 5 | | 1(1) | | | | | | | | | | | |
| 48 | Cd | 1 | 1 | 3 | 1 | 3 | 5 | 1 | 3 | 5 | | 1 | | | | | | | | | | | |
| 49 | In | 1 | 1 | 3 | 1 | 3 | 5 | 1 | 3 | 5 | | 1 | 1(1) | | | | | | | | | | |
| 50 | Sn | 1 | 1 | 3 | 1 | 3 | 5 | 1 | 3 | 5 | | 1 | 1 | | | | | | | | | | |
| 51 | Sb | 1 | 1 | 3 | 1 | 3 | 5 | 1 | 3 | 5 | | 1 | 2(1) | | | | | | | | | | |
| 52 | Te | 1 | 1 | 3 | 1 | 3 | 5 | 1 | 3 | 5 | | 1 | 2 | | | | | | | | | | |
| 53 | I | 1 | 1 | 3 | 1 | 3 | 5 | 1 | 3 | 5 | | 1 | 3(1) | | | | | | | | | | |
| 54 | Xe | 1 | 1 | 3 | 1 | 3 | 5 | 1 | 3 | 5 | | 1 | 3 | | | | | | | | | | |
| 55 | Cs | 1 | 1 | 3 | 1 | 3 | 5 | 1 | 3 | 5 | | 1 | 3 | | | 1(1) | | | | | | | |
| 56 | Ba | 1 | 1 | 3 | 1 | 3 | 5 | 1 | 3 | 5 | | 1 | 3 | | | 1 | | | | | | | |
| 57 | La | 1 | 1 | 3 | 1 | 3 | 5 | 1 | 3 | 5 | | 1 | 3 | 1(1) | | 1 | | | | | | | |
| 58 | Ce | 1 | 1 | 3 | 1 | 3 | 5 | 1 | 3 | 5 | 1 | 1 | 3 | | | 1 | | | | | | | |
| 59 | Pr | 1 | 1 | 3 | 1 | 3 | 5 | 1 | 3 | 5 | 2(1) | 1 | 3 | | | 1 | | | | | | | |
| 60 | Nd | 1 | 1 | 3 | 1 | 3 | 5 | 1 | 3 | 5 | 2 | 1 | 3 | | | 1 | | | | | | | |
| 61 | Pm | 1 | 1 | 3 | 1 | 3 | 5 | 1 | 3 | 5 | 3(1) | 1 | 3 | | | 1 | | | | | | | |
| 62 | Sm | 1 | 1 | 3 | 1 | 3 | 5 | 1 | 3 | 5 | 3 | 1 | 3 | | | 1 | | | | | | | |
| 63 | Eu | 1 | 1 | 3 | 1 | 3 | 5 | 1 | 3 | 5 | 4(1) | 1 | 3 | | | 1 | | | | | | | |
| 64 | Gd | 1 | 1 | 3 | 1 | 3 | 5 | 1 | 3 | 5 | 4(1) | 1 | 3 | 1(1) | | 1 | | | | | | | |
| 65 | Tb | 1 | 1 | 3 | 1 | 3 | 5 | 1 | 3 | 5 | 5(1) | 1 | 3 | | | 1 | | | | | | | |
| 66 | Dy | 1 | 1 | 3 | 1 | 3 | 5 | 1 | 3 | 5 | 5 | 1 | 3 | | | 1 | | | | | | | |
| 67 | Ho | 1 | 1 | 3 | 1 | 3 | 5 | 1 | 3 | 5 | 6(1) | 1 | 3 | | | 1 | | | | | | | |
| 68 | Er | 1 | 1 | 3 | 1 | 3 | 5 | 1 | 3 | 5 | 6 | 1 | 3 | | | 1 | | | | | | | |
| 69 | Tm | 1 | 1 | 3 | 1 | 3 | 5 | 1 | 3 | 5 | 7(1) | 1 | 3 | | | 1 | | | | | | | |
| 70 | Yb | 1 | 1 | 3 | 1 | 3 | 5 | 1 | 3 | 5 | 7 | 1 | 3 | | | 1 | | | | | | | |
| 71 | Lu | 1 | 1 | 3 | 1 | 3 | 5 | 1 | 3 | 5 | 7 | 1 | 3 | 1(1) | | 1 | | | | | | | |
| 72 | Hf | 1 | 1 | 3 | 1 | 3 | 5 | 1 | 3 | 5 | 7 | 1 | 3 | 1 | | 1 | | | | | | | |
| 73 | Ta | 1 | 1 | 3 | 1 | 3 | 5 | 1 | 3 | 5 | 7 | 1 | 3 | 2(1) | | 1 | | | | | | | |
| 74 | W | 1 | 1 | 3 | 1 | 3 | 5 | 1 | 3 | 5 | 7 | 1 | 3 | 2 | | 1 | | | | | | | |
| 75 | Re | 1 | 1 | 3 | 1 | 3 | 5 | 1 | 3 | 5 | 7 | 1 | 3 | 3(1) | | 1 | | | | | | | |
| 76 | Os | 1 | 1 | 3 | 1 | 3 | 5 | 1 | 3 | 5 | 7 | 1 | 3 | 3 | | 1 | | | | | | | |
| 77 | Ir | 1 | 1 | 3 | 1 | 3 | 5 | 1 | 3 | 5 | 7 | 1 | 3 | 4(1) | | 1 | | | | | | | |
| 78 | Pt | 1 | 1 | 3 | 1 | 3 | 5 | 1 | 3 | 5 | 7 | 1 | 3 | 5(1) | | 1(1) | | | | | | | |
| 79 | Au | 1 | 1 | 3 | 1 | 3 | 5 | 1 | 3 | 5 | 7 | 1 | 3 | 5 | | 1(1) | | | | | | | |
| 80 | Hg | 1 | 1 | 3 | 1 | 3 | 5 | 1 | 3 | 5 | 7 | 1 | 3 | 5 | | 1 | | | | | | | |
| 81 | Tl | 1 | 1 | 3 | 1 | 3 | 5 | 1 | 3 | 5 | 7 | 1 | 3 | 5 | | 1 | 1(1) | | | | | | |
| 82 | Pb | 1 | 1 | 3 | 1 | 3 | 5 | 1 | 3 | 5 | 7 | 1 | 3 | 5 | | 1 | 1 | | | | | | |
| 83 | Bi | 1 | 1 | 3 | 1 | 3 | 5 | 1 | 3 | 5 | 7 | 1 | 3 | 5 | | 1 | 2(1) | | | | | | |
| 84 | Po | 1 | 1 | 3 | 1 | 3 | 5 | 1 | 3 | 5 | 7 | 1 | 3 | 5 | | 1 | 2 | | | | | | |
| 85 | At | 1 | 1 | 3 | 1 | 3 | 5 | 1 | 3 | 5 | 7 | 1 | 3 | 5 | | 1 | 3(1) | | | | | | |
| 86 | Rn | 1 | 1 | 3 | 1 | 3 | 5 | 1 | 3 | 5 | 7 | 1 | 3 | 5 | | 1 | 3 | | | | | | |

CHART II—Continued

*Number of Wires in Each Shell and Subshell*

[Each wire has two electrons placed in direct opposition to each other, on each side of the nucleus, unless (1) appears after the number. In that case, place only one electron on the wire farthest from the nucleus]

| Atomic number | Element symbol | Shells | | | | | | | | | | | | | | | | | | | |
|---|---|---|---|---|---|---|---|---|---|---|---|---|---|---|---|---|---|---|---|---|---|
| | | K | L | | M | | | N | | | | O | | | | P | | | | Q | |
| | | 1 | 2 | | 3 | | | 4 | | | | 5 | | | | 6 | | | | 7 | |
| | | Subshells | | | | | | | | | | | | | | | | | | | |
| | | s | s | p | s | p | d | s | p | d | f | s | p | d | f | s | p | d | f | s | p | d | f |
| 87 | Fr | 1 | 1 | 3 | 1 | 3 | 5 | 1 | 3 | 5 | 7 | 1 | 3 | 5 | | 1 | 3 | | | 1(1) | | | |
| 88 | Ra | 1 | 1 | 3 | 1 | 3 | 5 | 1 | 3 | 5 | 7 | 1 | 3 | 5 | | 1 | 3 | | | 1 | | | |
| 89 | Ac | 1 | 1 | 3 | 1 | 3 | 5 | 1 | 3 | 5 | 7 | 1 | 3 | 5 | | 1 | 3 | 1(1) | | 1 | | | |
| 90 | Th | 1 | 1 | 3 | 1 | 3 | 5 | 1 | 3 | 5 | 7 | 1 | 3 | 5 | | 1 | 3 | 1 | | 1 | | | |
| 91 | Pa | 1 | 1 | 3 | 1 | 3 | 5 | 1 | 3 | 5 | 7 | 1 | 3 | 5 | 1 | 1 | 3 | 1(1) | | 1 | | | |
| 92 | U | 1 | 1 | 3 | 1 | 3 | 5 | 1 | 3 | 5 | 7 | 1 | 3 | 5 | 2(1) | 1 | 3 | 1(1) | | 1 | | | |
| 93 | Np | 1 | 1 | 3 | 1 | 3 | 5 | 1 | 3 | 5 | 7 | 1 | 3 | 5 | 2 | 1 | 3 | 1(1) | | 1 | | | |
| 94 | Pu | 1 | 1 | 3 | 1 | 3 | 5 | 1 | 3 | 5 | 7 | 1 | 3 | 5 | 3(1) | 1 | 3 | 1(1) | | 1 | | | |
| 95 | Am | 1 | 1 | 3 | 1 | 3 | 5 | 1 | 3 | 5 | 7 | 1 | 3 | 5 | 4(1) | 1 | 3 | 0 | | 1 | | | |
| 96 | Cm | 1 | 1 | 3 | 1 | 3 | 5 | 1 | 3 | 5 | 7 | 1 | 3 | 5 | 4(1) | 1 | 3 | 1(1) | | 1 | | | |
| 97 | Bk | 1 | 1 | 3 | 1 | 3 | 5 | 1 | 3 | 5 | 7 | 1 | 3 | 5 | 4 | 1 | 3 | 1(1) | | 1 | | | |
| 98 | Cf | 1 | 1 | 3 | 1 | 3 | 5 | 1 | 3 | 5 | 7 | 1 | 3 | 5 | 5(1) | 1 | 3 | 1(1) | | 1 | | | |
| 99 | Es | 1 | 1 | 3 | 1 | 3 | 5 | 1 | 3 | 5 | 7 | 1 | 3 | 5 | 5 | 1 | 3 | 1(1) | | 1 | | | |
| 100 | Fm | 1 | 1 | 3 | 1 | 3 | 5 | 1 | 3 | 5 | 7 | 1 | 3 | 5 | 6(1) | 1 | 3 | 1(1) | | 1 | | | |
| 101 | Md | 1 | 1 | 3 | 1 | 3 | 5 | 1 | 3 | 5 | 7 | 1 | 3 | 5 | 6 | 1 | 3 | 1(1) | | 1 | | | |
| 102 | No | 1 | 1 | 3 | 1 | 3 | 5 | 1 | 3 | 5 | 7 | 1 | 3 | 5 | 7(1) | 1 | 3 | 1(1) | | 1 | | | |

The numerals under each of the subheadings s, p, d and f indicate the number of wires, simulating orbits, in each subshell, each orbit having a pair of diametrically disposed electrons, except in the case of those numerals having thereafter the numeral "1" in parentheses, which indicates that there is only one electron on that orbit. For instance, under atomic number 11 for the element sodium, we find under the heading of shell K, subshell s, the numeral "1," which indicates that there is but a single orbit having a pair of electrons in the K-shell; under the L heading, we find the numeral "1" under the letter s, and the numeral "3" under the letter p, thus indicating that, in the L-shell, there is one orbit in the s subshell, and three orbits in the p subshell, and that each orbit includes a pair of electrons. Under the M-shell heading and subheading s, there is found the numeral (1), and nothing under the subheadings p and d, indicating that in the M-shell, there is but a single orbit in the s subshell, and that there is but a single electron in that orbit. From this information, it is possible to assemble the model of the atom for sodium, resulting in the arrangement illustrated in FIG. 13.

From a study of Chart II, the following facts are noted: the K-shell heading includes only one orbit, under the s subshell; the L-shell heading includes subshell s and p and there is never more than one orbit in subshell s nor more than 3 in subshell p; the M-shell heading includes subshells s, p and d and there is never more than one orbit in subshell s nor more than 3 orbits in subshell p, nor more than five orbits in subshell d; the N-shell heading includes a subshell s, p, d and f, and there is never more than one orbit in subshell s nor more than three orbits in subshell p, nor more than five orbits in subshell d, nor more than seven orbits in subshell f; the O-shell heading includes subshells s, p, d and f and there is never more than one orbit in subshell s, nor more than three orbits in subshell p, nor more than five orbits in subshell d, nor more than seven orbits in subshell f. The P-shell heading incudes the subheadings s, p, d, and it will be noted that there is never more than one orbit in subshell s, nor more than three orbits in subshell p, nor more than one orbit in subshell d. The Q-shell heading includes only the subheading s and it will be noted that there is never more than one orbit in this subshell.

From the foregoing, it is evident that it is possible to assemble models of any of the known elements, following this chart, by the use of not more than three different kinds of cylinders. The three different kinds needed are shown in FIGS. 14, 15 and 16, respectively.

Referring to FIG. 14, there is shown an upper cylinder 114 and a lower cylinder 116, each cylinder having an axial bore 118 and sixteen transverse bores 120. The bores 120 are each arranged parallel with a diameter, and each is arranged at an angle relative to an adjacent one, so that the ends thereof lie along a pair of parallel helices, as shown, the helix in the upper cylinder 114 being right handed and the helix in the lower cylinder 116 being left handed. Furthermore, it should be noted that, beginning at the lower end of the upper cylinder 114 and at the upper end of the lower cylinder 116, that the transverse bores 120 are grouped as follows: a first group, comprising a single bore, designated s; a second group, comprising three bores, designated p; a third group, comprising five bores, designated d; and a fourth group comprising seven bores, designated by f.

FIG. 15 shows a different construction of cylinders comprising an upper cylinder 100 and a lower cylinder 102, each having an axial bore 104, and a series of transverse bores 106. Similar to the arrangement of FIG. 14, the bores 106 pass parallel with a diameter, and are angularly arranged so that their ends lie in a pair of parallel helices, being disposed right handed and left handed, as shown. Each cylinder contains nine transverse bores 106, arranged in three groups as follows: a single bore 106 designated s; a second group comprising three bores, designated p; and a third group comprising five bores designated d.

The two cylinders shown in FIG. 16 follow the same general pattern, comprising an upper cylinder 86 and a lower cylinder 88, each having an axial bore 90, and a series of transverse bores 92, the latter latter bores being arranged parallel with a diameter, and angularly arranged to one another so that the ends thereof lie along a pair of parallel helices, disposed right handed and left handed, as shown. Each of the cylinders 86 and 88 includes five bores 92, arranged in three groups as follows: a first group having a single bore s; a second group, having three bores, designated p; and a third group having a single bore designated d.

From the foregoing, it is evident that the cylinders 86 and 88, each having five transverse bores arranged in groups of 1—3—1, can be used in the assembly of the K, L, P, and Q-shells. The cylinders 100 and 102, shown in FIG. 15, each having nine transverse bores 106 arranged 1—3—5, can be used for the M-shells; and the cylinders 114 and 116, shown in FIG. 14, each having 16 transverse bores 120, arranged in groups of 1—3—5—7, can be used to form the N and O-shells.

From the foregoing, it is evident that a simple kit can be made containing all of the parts required to assemble a model of any of the known elements, following Pauli's Exclusion Theory, comprising the following parts: a plurality of core members 78, a plurality of pins having heads of at least two different colors or a plurality of small beads or similar objects of at least two different colors, which may be attached to the surface of the bore members by pressure sensitive adhesive or other adhesive agent, a plurality of straight wires 110 of different lengths, such as shown in FIG. 12, a plurality of arcuate wires 84, 98 and 108, and longer wires for construction of models of atoms having shells N, O, P and Q, such as shown in FIG. 11, a plurality of beads 94, and a plurality of upper and lower shells 86, 88, 100, 102, 114 and 116.

From the foregoing, it is obvious that we have devised novel kits employing a minimum number of parts, which can be assembled to form models of the atoms of all of the known elements, and many of the elements likely to be discovered.

Having fully described our invention, it is to be understood that we do not wish to be limited to the details set forth herein, but that our invention is of the full scope of the appended claims.

We claim:

1. A model of an atom, comprising: shell simulating means, said shell simulating means including at least one simulated shell, each simulated shell being concentric with other simulated shells comprising at least one flexible member, each flexible member being arranged in a circle to simulate an orbit, at least one member, simulating an electron, being attached to each flexible member; a core member; differently colored objects carried by said core member to simulate a nucleus of an atom; and supporting means maintaining said core member and said flexible member in substantially concentric relation.

2. A model of an atom as defined in claim 1, in which each simulated shell comprises at least one simulated subshell, each simulated subshell including at least one flexible member, the flexible members of different simulated subshells being disposed in separate groups.

3. A model of an atom as defined in claim 1, in which each flexible member carries, in a model for an atom having an even number of electrons, two electron simulating members.

4. A model of an atom as defined in claim 1, in which, in a model for an atom having an odd number of electrons, one flexible member carries a single electron simulating member and each of the remaining flexible members carries two electron simulating members.

5. A model of an atom as defined in claim 4, in which the flexible member carrying the single electron simulating member is disposed in the outermost simulated shell.

6. A model of an atom as defined in claim 1, in which a pair of electron simulating members carried by a single flexible member are disposed substantially 180° apart.

7. A model of an atom as defined in claim 1, in which each flexible member carries a single electron simulating member.

8. A model of an atom as defined in claim 1, in which each flexible member comprises a resilient wire.

9. A model of an atom as defined in claim 1, in which each flexible member comprises a resilient wire, and in which each member, simulating an electron, comprises a bead strung on said wire.

10. A model of an atom as defined in claim 1, in which said supporting means includes spaced cylinders each having a plurality of apertures, and in which each flexible member comprises a resilient wire received in one of said apertures.

11. A model of an atom as defined in claim 10, in which the apertures in said cylinders extend transversely thereof in different planes.

12. A model of an atom as defined in claim 10, in which the apertures in said cylinders extend transversely thereof in spaced axial and angular relation.

13. A model of an atom as defined in claim 10, in which said apertures in said cylinders extend transversely thereof parallel with and to one side of a diameter.

14. A model of an atom as defined in claim 10, in which the ends of the apertures are disposed in parallel, helical, paths.

15. A model of an atom as defined in claim 10, in which said cylinders have a like plurality of apertures, and the ends of the apertures are disposed in helical paths extending about the longitudinal axes of said cylinders, the helical path in one of said spaced supporting cylinders being right handed, and the helical path in the other spaced supporting cylinder being left handed.

16. A model of an atom as defined in claim 10, in which each wire passes through an aperture in one cylinder and the ends of the wire are received within an aperture in another cylinder.

17. A model of an atom as defined in claim 10, in which each wire passes through an aperture spaced a certain distance from the outer end of one cylinder and the ends of the wire are received within an aperture spaced the same relative distance from the inner end of another cylinder.

18. A model of an atom as defined in claim 1, in which said supporting means includes spaced cylinders, each cylinder having an axial bore and being diametrically disposed relative to said core member, and a wire passing through said core member and said axial bores.

19. A model of an atom as defined in claim 1, in which said core member comprises a transparent plastic sphere.

20. A model of an atom as defined in claim 1, in which said core member is spherical in form, and in which said differently colored objects comprise pins attached to said core member, said pins having two differently colored heads.

21. An atom model construction kit, comprising: a plurality of wires; a plurality of core members, each core member being receivable on one of said wires to simulate the nucleus of an atom; a plurality of pins having heads of at least two different colors, each of said pins being attachable to said core to simulate a nucleus constituent of said atom; a plurality of beads, said beads each being receivable on others of said wires to simulate electrons of said atom; and a plurality of apertured cylinders, said cylinders being receivable in pairs on said one wire and being adapted to support the others of said wires in circular configurations to thereby simulate electron shells.

22. An atom model construction kit as defined in claim 21, in which some of the wires are straight and some are arcuate, the straight wires being of various lengths and being adapted to support said cores, and the arcuate wires being of various lengths and being adapted to be connected to said cylinders to simulate electron shells and to support said beads.

23. An atom model construction kit as defined in claim 22, in which the straight wires fall in less than eight different lengths, and in which the arcuate wires fall in less than eight different lengths.

24. An atom model construction kit as defined in claim 21, in which some wires include spaced markings to facilitate assembly of said cores and said cylinders thereon.

25. An atom model construction kit as defined in claim 21, in which the core members are a plastic.

26. An atom model construction kit as defined in claim 21, in which each cylinder includes a longitudinal bore for receiving said one wire and a plurality of transversely disposed apertures for receiving and supporting said others of said wires.

27. An atom model construction kit as defined in claim 26, in which said transversely disposed apertures lie in different axial planes.

28. An atom model construction kit as defined in claim 26 in which said transversely disposed apertures are parallel to and offset from a diameter.

29. An atom model construction kit as defined in claim 26, in which the ends of said transverse apertures are disposed in a pair of helices.

30. An atom model construction kit as defined in claim 26, in which the transverse apertures are disposed in pairs, and the corresponding ends of the apertures lie along a pair of parallel adjacent helices.

31. An atom model construction kit as defined in claim 26, in which the ends of the transverse apertures are disposed in a pair of helices, the helices on some cylinders being right handed, and the helices on other cylinders being left handed.

32. An atom model construction kit as defined in claim 26, in which the transversely disposed apertures are arranged in two or more groups, the axial spacing of adjacent apertures within a group being less than the axial spacing between adjacent groups.

33. An atom model construction kit as defined in claim 26, in which some cylinders have not more than eight transverse apertures, other cylinders have not less than twenty-four transverse apertures, and still other cylinders have not less than thirty-two transverse apertures.

34. An atom model construction kit as defined in claim 26, in which some of the cylinders include five transversely disposed apertures, arranged in three axially spaced groups, there being two groups each having a single aperture, and a third group having three apertures.

35. An atom model construction kit as defined in claim 26, in which some of the cylinders include nine transversely disposed apertures, arranged in three axially spaced groups, there being a first group having a single aperture, a second group having three apertures, a third group having five apertures, and a fourth group having seven apertures.

36. An atom model construction kit as defined in claim 26, in which some of the cylinders include sixteen transversely disposed apertures, arranged in four axially spaced groups, these being a first group having a single aperture, a second group having three apertures, a third group having five apertures, and a fourth group having seven apertures.

References Cited in the file of this patent

UNITED STATES PATENTS

| | | |
|---|---|---|
| Re. 23,587 | Novak | Nov. 18, 1952 |
| 144,124 | Oberndorf | Oct. 28, 1873 |
| 2,052,457 | French | Aug. 25, 1936 |
| 2,218,078 | Assmuth et al. | Oct. 15, 1940 |

FOREIGN PATENTS

| | | |
|---|---|---|
| 55,975 | France (First Addition) (Addition to 991,133) | June 4, 1952 |
| 713,589 | Great Britain | Aug. 11, 1954 |
| 561,770 | Belgium | Nov. 14, 1957 |

OTHER REFERENCES

Eimer and Amend (85th Anniv. Catalog) year 1936, page 618 only. Atomic Models Set No. 28,599. Library Class: QD-53-E54.